United States Patent
Bertram (10) Patent No.: US 6,494,978 B1
(45) Date of Patent: Dec. 17, 2002

(54) DETERIORATED STRUCTURE REPAIR METHOD FOR RESTORING AND LINING CORRODED STRUCTURE

(76) Inventor: Richard L. Bertram, 8577 Wonderland Ave., Hollywood, CA (US) 90046

(*) Notice: Subject to any disclaimer, the term of this patent is extended or adjusted under 35 U.S.C. 154(b) by 0 days.

(21) Appl. No.: 09/566,761

(22) Filed: May 8, 2000

Related U.S. Application Data (63) Continuation of application No. 08/416,191, filed on Apr. 4, 1995, now abandoned, which is a continuation-in-part of application No. 08/387,240, filed on Feb. 13, 1995, now abandoned.

(51) Int. Cl.[7] .................. B29C 63/00; B29C 63/26; B29C 63/30
(52) U.S. Cl. .............. 156/79; 138/97; 156/94; 156/294; 156/304.3; 156/305; 264/36.16; 264/36.22; 264/46.5; 264/262; 264/269
(58) Field of Search .................. 156/79, 94, 157, 156/272.6, 294, 304.3, 304.5, 305, 308.6, 309.3, 310, 315, 316; 264/36.15, 36.16, 36.22, 46.5, 262, 269; 138/97, 98; 405/151, 152, 153; 52/742.13, 745.13, 745.2

(56) References Cited

U.S. PATENT DOCUMENTS

| | | | |
|---|---|---|---|
| 2,388,297 A | * | 11/1945 | Slaughter |
| 3,198,692 A | * | 8/1965 | Bridgeford |
| 4,585,371 A | * | 4/1986 | Jones-Hinton |
| 4,728,223 A | * | 3/1988 | Rice |
| 4,792,493 A | * | 12/1988 | Bertram et al. |
| 4,915,542 A | * | 4/1990 | Fernando |
| 4,933,220 A | * | 6/1990 | Petzold et al. |
| 5,190,705 A | * | 3/1993 | Corazza |
| H1163 H | * | 4/1993 | Bone |
| 5,241,993 A | * | 9/1993 | Stephens |
| 5,248,562 A | * | 9/1993 | Palermo et al. |
| 5,268,392 A | * | 12/1993 | Bertram |
| 5,279,882 A | * | 1/1994 | Daude et al. |
| 5,357,005 A | * | 10/1994 | Buchwalter et al. |
| 5,389,692 A | * | 2/1995 | Bertram |
| 5,458,155 A | * | 10/1995 | Stephens |
| 5,458,953 A | * | 10/1995 | Wang et al. |
| 5,928,447 A | * | 7/1999 | Gian |
| 5,942,330 A | * | 8/1999 | Kelley |

FOREIGN PATENT DOCUMENTS

| | | | |
|---|---|---|---|
| DE | 2912479 | * | 10/1980 |
| EP | 475769 | * | 3/1992 |
| GB | 2123919 | * | 2/1984 |
| JP | 54-133575 | * | 10/1979 |
| WO | WO 90/02851 | * | 3/1990 |

* cited by examiner

Primary Examiner—Steven D. Maki
(74) Attorney, Agent, or Firm—Hall, Priddy, Myers & Vande Sande (57) ABSTRACT

A method for protecting and for restoring structural strength and substance to a concrete, fluid containing or conducting structure deteriorated to the condition of removal of substance of the concrete by sulfuric acids and like corrosive material in contact therewith is described by positioning a relatively thin thermoplastic layer of polyvinyl chloride or polyethylene, injecting a substratum of epoxy foam, polyurethane foam, or a combination thereof between the thermoplastic layer and the deteriorated concrete, and welding the foam to the thermoplastic layer. The product of the process is described.

4 Claims, 6 Drawing Sheets

DETERIORATED STRUCTURE REPAIR METHOD FOR RESTORING AND LINING CORRODED STRUCTURE

CONTINUATION-IN-PART APPLICATION

This application is a continuation of Ser. No. 08/416,191 filed Apr. 4, 1995, now abandoned, which is a continuation-in-part of Application Serial No. 08/387,240 filed Feb. 13, 1995, now abandoned, in the name of Richard L. Bertram, Applicant herein, for "Material and Method for Welding a Seam between Thermoplastic Liner Sheets," priority of filing date for all subject matter common to this and said parent application being herby claimed.

BACKGROUND OF THE INVENTION

1. Field of the Invention

The present invention relates to the art of restoring deteriorated concrete or metal structures to resist corrosion, and more particularly to the application of polymer substances to restore substratum removed by corrosive deterioration, with lining of polymer substance to resist corrosion.

2. Description of the Prior Art

Waste water and sewerage are frequently conducted through fluid conduits made of concrete. In some applications, the conduits are made of metal. Sewer systems frequently have reservoirs, containers and ponds, such as settling ponds which also are made of concrete and sometimes of metal. Sewerage and waste water often contain highly corrosive material, especially with respect to concrete and metal. The closed system which constitutes most sewerage systems in use presently, creates anaerobic conditions ideal for the proliferation of anaerobic bacteria which result in hydrogen sulfide. Consequently, waste water pipes, sewage pipes, reservoirs, containers and ponds frequently are the subject of substantial corrosion and deterioration. In addition, corrosive material resulting from the digestive by-products of organisms existing within the waste water and sewer systems cause substantial deterioration of the concrete and metal conduits.

Here in this specification for simplicity of explanation, reference will often be made to "conduits," by which term I intend to include not only conduits and pipes, but also reservoirs, containers and ponds as discussed above. Such a "conduit," as that term is used herein, includes, for example, settling or processing "ponds" at sewerage processing plants, back-up reservoirs and building structures involved with such processing, unless the text specifies otherwise.

The deterioration frequently takes the form of physical decay of the walls of the conduits so that the thickness of the walls is reduced. Actual amounts of the concrete or metal are literally removed or worn away over the years. In many instances, sewer and waste water conduits and like structures have walls so thin that the conduits have collapsed under the weight of traffic 1 passing over them, and it has been reported that people have stuck their arms through them with relative ease.

Another undesirable effect of the corrosion and deterioration is that in the weakened condition that thin walls have, the walls crack more easily, resulting in leaks in the sewer system. Such leaks undermine the soil or prepared beds in which the concrete or metal pipes lay. Further, such leaks may contaminate the aquifer, may pollute the water ways and may surface to make the environment above unpleasant, as well.

Some of the more common corrosive materials within sewer conduits are sulfuric acid and hydrogen sulfide, which can turn into sulfuric acid under the conditions frequently found in sewer systems. Their corrosive effects may be readily appreciated. Sewer conduits normally have an anaerobic slime deposit along the wall of the conduit which is submerged below the liquid line or level. Various metal sulfates are among the more common ingredients of this anaerobic deposit. In the substantially liquid waste water, the sulfates reduce to sulfide ions, which combine with the hydrogen in the waste water to outgas above the liquid level as hydrogen sulfide, which can be highly corrosive to metals. Some sewer pipes are made of metal, and many more concrete pipes have metal, i.e. steel reinforcing ribs or bars and like support structure embedded within. Oxygen condenses on the upper portions of the interior surface of the conduit walls which are not in contact with the liquid being conducted, and interacts with bacteria within the conduit above the liquid level. The bacteria produces more hydrogen sulfide. Oxygen from the liquid and condensing from the water in the air reacts with the hydrogen sulfide acid to create the highly corrosive sulfuric acid. The hydrogen of the acid reacts with the calcium hydroxide in the cement of the concrete conduit, and calcium results as gypsum or calcium sulfate, which has been described as a soft corrosion product. The gypsum drops off the interior of the wall itself, making the wall more thin and substantially weakened. In this manner, whole chunks of the concrete wall are removed or vanish, reducing the thickness of the wall.

Restoring such damaged and weakened conduits and pipes in the past has been accomplished primarily through two fundamental methods. In one basic modality, the concrete conduits are entered and fresh concrete is troweled onto the walls to build the thickness back to the original dimension. This method is somewhat problematic in that troweling on the roof of the conduit requires special efforts and time. Frequently, such as in sewer conduits, for example, the repair must be performed within a specified time window. Usually, sewer conduits have a relatively lower flow rate or level during the hours between midnight and the normal waking hours of around seven in the morning. After the normal waking hours, most sewer conduits are so full that entry into the conduit and any repair are not possible.

Sometimes, plywood forms are put into place in a concrete waste water structure, and concrete is poured behind the wood forms to restore the thickness of the deteriorated concrete. This method creates problems. It takes approximately twenty-eight days for concrete to cure fully. Normally, seven days are minimally required before the plywood forms are removed. Meanwhile, the sewer necessarily goes through its daily fill and retreat cycles.

A second modality involves a process of digging from the top surface down to the weakened conduit. The earth around the weakened conduit is excavated, and a layer of concrete of suitable thickness is poured around the weakened conduit to, in effect, provide a new conduit encasing the old, crumbling sewer pipe. This method has special problems, as well. For example, most such pipes are underneath roadways and streets. Excavating down to the sewer pipe requires removing the surface road or street and diverting traffic often for weeks at a time. The amount of concrete required to encase the old pipe is substantial. The manpower required for excavating, concrete pouring and road and street restoration is substantial, as well. Both in time and material, such repair or restoration is expensive, and the disruption to street traffic is costly to the public.

Other modalities exist, such as for example a method called "slip lining," in which new pipe is inserted within the old, crumbling pipe to strengthen the pipe walls. Such methods reduce the diameter of the pipe or conduit and create problems with connecting lateral pipes joined to the pipe being repaired or restored.

Many of the methods used in the past result in a restored conduit which has a surface facing the effluent made of the same material that deteriorated before. This problem has been addressed by coating or lining the interior facing surfaces after restoration of the conduit, but such liners or coatings have met with only varying levels of satisfaction. Further, many of such methods result in a concrete or metal pipe in which the restoration is rigid or brittle. The brittleness of the restoration itself may soon result in further cracking from thermal cycling and normal as well as violent ground movement.

It has been known in the past to provide lining for the interior surfaces of such conduits and pipes. See, for example, my U.S. Pat. No. 4,792,493 issued to Vernie L. Belcher and myself. Such linings greatly enhance the ability of the conduit to resist the corrosive effects of the many acids, caustics, toxins and organic material common in waste water and sewer systems. Lining, without more, however, is appropriate only where the fundamental integrity of the conduit wall is substantially unimpaired, and its thickness is sufficiently strong enough to contain the substances being conducted through the pipe or conduit, and sufficiently strong enough to support the earth and roadway systems above it. Where the integrity of the conduit wall is diminished, restoration of the concrete or metal structure of the conduit is necessary before a lining is applied.

It is desired to provide improved methods for restoring the interior integrity of concrete and metal conduits and pipes having exposure to highly corrosive substances. It is desired, further, to provide such methods which, when applied, will provide great resistance to such corrosive substances and will restore some strength to the repaired structure. It is a further desire to restore strength to a deteriorated structure being restored that results in a measure of flexibility to the structure in order to resist cracking and consequent leaks. It is greatly desired and sought to provide such a method which can be applied and cured or set within tight time windows available for such restoration. It is yet another object to provide a method or process for restoring a deteriorated concrete or metal structure that results in a corrosive resistant layer facing the fluid being contained or conducted, where the layer has its seams with adjacent layers welded to prevent very small pin holes or cracks from developing, and where the layer is welded to a structural substratum. It is yet a further object to provide a method or process for restoring a deteriorated concrete or metal structure where the positioning of a corrosive resistant layer is established prior to restoring substance to the substratum.

SUMMARY

In brief, in accordance with one aspect of the present invention, a method for restoring concrete or metal conduits, pipes and like structures is described in which a plurality of thermoplastic liners are positioned at approximately the position of the surface of the concrete conduit which has been removed by corrosion. The liners are held in position by seating in channels which are made of thermoplastic and which can be welded to the liners to make a seam resistant to leaking or fluid penetration. The liners have their surfaces facing the corroded concrete treated to weld with an epoxy or polyurethane foam to be inserted in the void space defined by the thermoplastic liners and the corroded concrete.

An epoxy resin or a polyurethane resin is hydrogenated and inserted in the void space along with an isocyanate to create a foam. The foam welds to the thermoplastic liners to create a structural substratum that restores the thickness and strength to the corroded concrete, and which substratum presents a thermoplastic liner resistant to corrosive waste water and sewer fluids being conducted through a waste water or sewer conduit. The thermoplastic liners become part of the resulting, finished restoration, and need not be removed.

Other novel features which are believed to be characteristic of the invention, both as to organization and methods of operation, together with further objects and advantages thereof, will be better understood from the following description in which preferred embodiments of the invention are described by way of example.

DESCRIPTION OF THE PREFERRED EMBODIMENT

Figure 1:
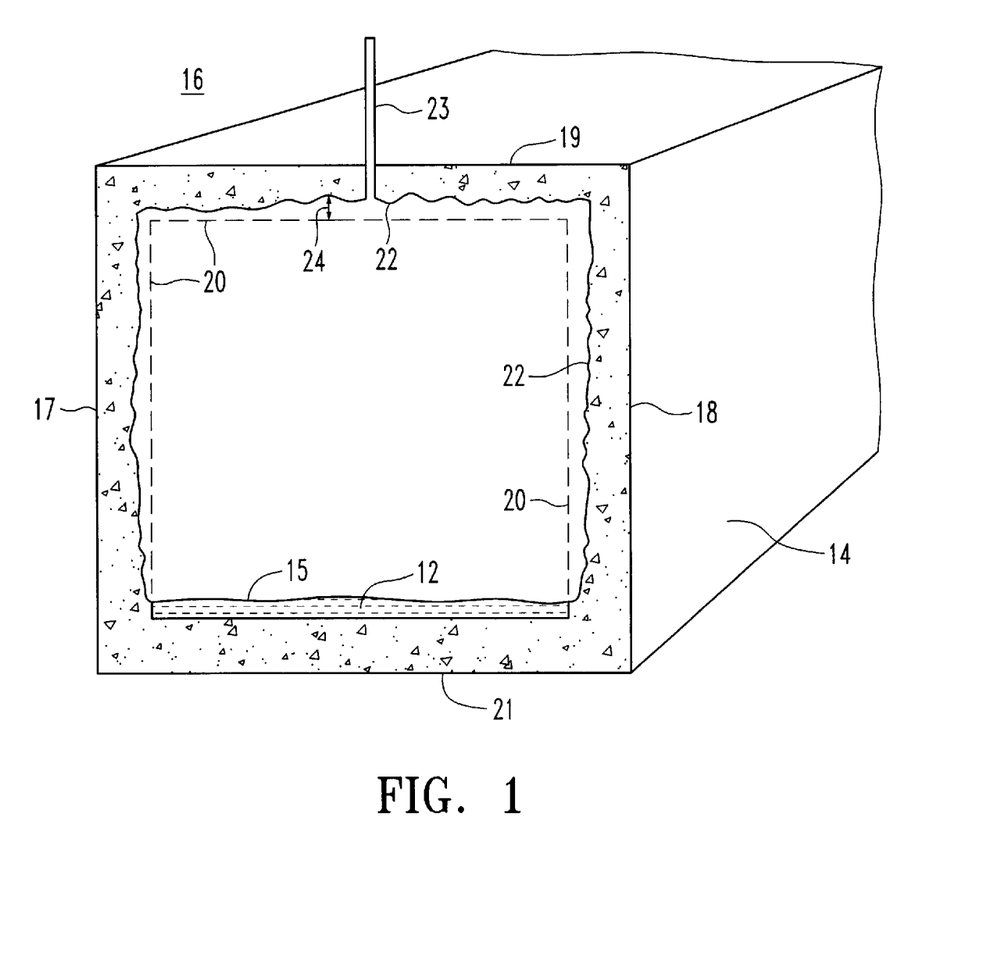
FIG. 1 is a cross-sectional elevation view of a fluid conduit within the ground showing deterioration thereof.

Waste water 12 is conducted normally through a concrete sewer conduit or pipe 14 positioned underneath the ground 16, frequently beneath roadways and streets, reference being had initially to FIG. 1 of the accompanying drawings. The waste water 12 has a liquid level 15 which rises and falls during the cycle of use of the sewer system. Normally, the liquid level 15 is relatively low, as shown in the accompanying FIG. 1 during the hours of from midnight to 7:00 a.m. o'clock. The level rises sharply around 7:00 a.m. o'clock and stays relatively high during the day until late in the evening hours.

As explained above, the side walls 17, 18 and the top wall or ceiling 19 of the pipe 14 are corroded primarily in those portions which are not submerged during portions of the cycle of use. The broken line 20 represents the original interior surface of the walls 17, 18, 19 before deterioration removed substantial portions. The interior surface 22 results after substantial portions 24 of the walls 17, 18, 19 are removed by the corrosion and deterioration to result in void spaces 24 within the conduit 14 where concrete once existed.

A port 23 may exist through the top wall 19 and provide a pneumatic conduit to some accessible area, as will be explained in greater detail below.

Figure 2:
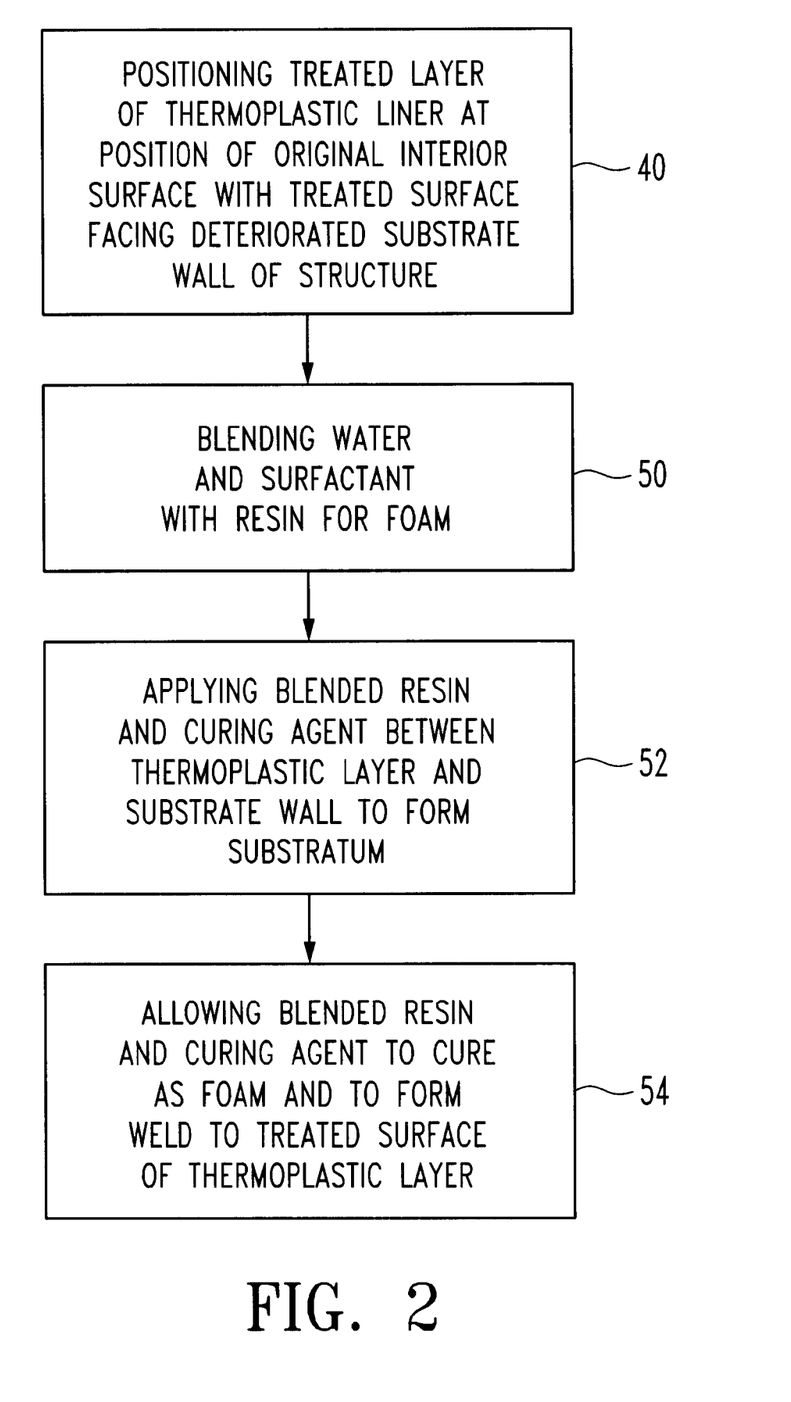
FIG. 2 is a block diagram of the method of the preferred embodiment of the present invention showing the steps thereof.

As set forth in FIG. 2, the process of the preferred embodiment of the present invention has a first step 40 of positioning thermoplastic liners generally along the position which the original interior surface 20 of the conduit 14 defined before deterioration. The thermoplastic liners could be positioned in any configuration as circumstances may suggest, as will be appreciated by those skilled in the art. The preferred thermoplastic liner consists of a relatively thin layer of polyvinyl chloride. The polyvinyl chloride is, preferably, an extruded thermoplastic liner or layer capable of resisting the corrosive gases, acids, bacteria and other corrosive materials or corrosion causing materials within the waste water collection and treatment system.

The thermoplastic layers or liners 25, 34, 55 could be a polyethylene. Such polyethylene can be prepared for bonding with the interior facing surface 32 by roughening or ionizing of the surface to be bonded with a gas flame of propane or methylacetylene propane. The bonding surface may be roughened by a discharge of electrical energy through the polyethylene liner, or layer in the corona spectrum.

Figure 3:
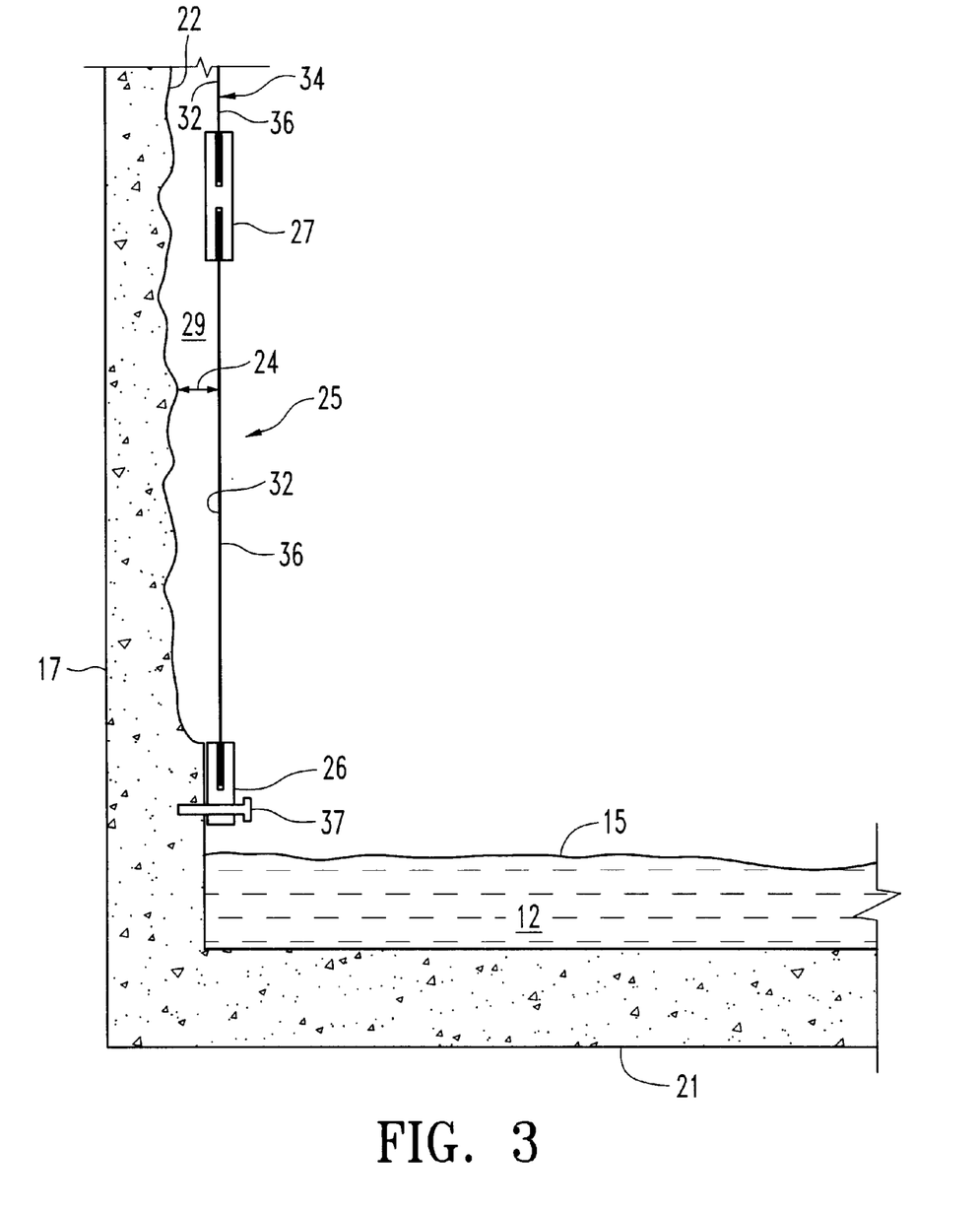
FIG. 3 is cross-sectional, side elevation view of one of the steps of the preferred embodiment of the present invention.

In FIG. 3, a procedure for implementing the first step 40 can be seen in greater detail, where that portion of the conduit 14 where the floor 21 joins the side wall 17 is shown in cross-sectional elevation. The waste water 12 has a working level 15, which is below the deterioration 24 experienced within the conduit 14. A polyvinyl chloride liner or sheet 25 is positioned from the commencement of the deterioration 24, upward along the line of the original interior surface 20. The polyvinyl chloride is held in position at its bottom edge by a U shaped channel or fitting 26, and at its upper edge by an H shaped channel or fitting 27. A second polyvinyl chloride sheet or layer 34 is held in a generally co-planar position on at least its bottom end in the H shaped channel 27. Each of the polyvinyl chloride liners 25, 34 has a surface 32 which faces the void 29 defined by the liners 25, 34 and the concrete's surface 22 to where the concrete has deteriorated. Each of these polyvinyl chloride liners 25, 34 also has a surface 36 facing the interior of the conduit 14 and the corrosive waste water 12 when its level 15 rises in the normal daily cycle. The surfaces 32 of the polyvinyl chloride which face the void 29 are prepared for bonding with the substratum 28, which will be a urethane foam as will be explained below, by applying a clear moisture-cured polyurethane primer-activator.

Another procedure for activating polyvinyl chloride liner is set forth in my U.S. Pat. No. 4,792,493, the methods and means set forth therein being incorporated herein in this application as though fully set forth at length. It has been found that where the polyvinyl chloride liners 25, 34 have their surfaces 32, which are to abut the substratum 28, treated to result in an hydroxyl resin modification, the polyvinyl chloride will chemically weld to the substratum 28, which will comprise a polyurethane having an isocyanate in the composition. It has been found that when the polyvinyl chloride liners 25, 34 are extruded having at least in or on their surfaces 32 a chemical composition comprising a polymer wherein the polymer is a copolymer of 2-propenoic acid, 2-hydroxypropyl ester, chloroethene and ethenyl acetate the polymer having a density of approximately 1.37 grams per cubic centimeter at 25 degrees Centigrade and a molecular weight of approximately 8,000 to 10,000, the surfaces are properly activated, and will chemically weld to the polyurethane having an isocyanate in the composition. Used as the substratum 28, the polyurethane will result in a chemical weld at ambient temperatures down to 40 degrees Fahrenheit. This procedure is set forth more fully in my co-pending application Ser. No. 387,240 filed Feb. 13, 1995, the contents of which are incorporated herein as though fully set forth at length.

Figure 4:
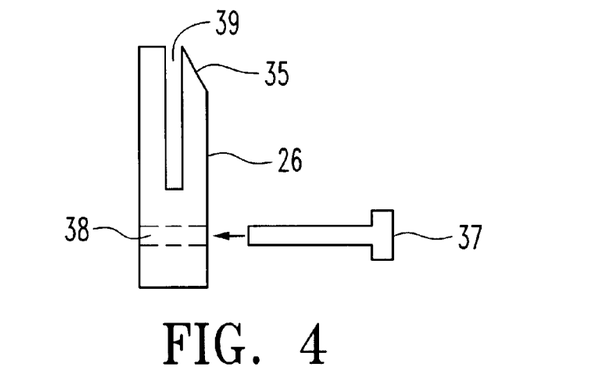
FIG. 4 is a detail of an anchor fitting useful in the preferred embodiment of the present invention.

In FIG. 4, the U shaped fitting or channel 26 is shown in greater detail. The channel 26 is positioned and held in place by bolt 37, which is inserted through hole 38 and secured to the side wall 17 (FIG. 3). The channel 26 has a channel slot 39, for receiving the bottom edge of the polyvinyl chloride liner 25. The upper edge of the channel 26 is beveled 35 so that, when the channel 26 is in place secured to the wall 17, as shown in FIG. 3, condensation will likely not collect in the corner which would be formed had the bevel 35 not exist. The channel 26 is made from polyvinyl chloride which is relatively rigid. A polyvinyl chloride having an ASTM modulus of elasticity of 405.000 with an ASTM flexural strength of 11.40, an ASTM tensile strength or yield of 7000 and a specific gravity of 1.4 has been found satisfactory.

The interior surfaces of the channel slot 39 should be treated so as to form a chemical weld with the polyvinyl chloride liner 25. If the interior surfaces of the channel slot 39 have an hydroxyl resin modification, as described above, the interior surfaces of the channel slot 39 will weld with the polyvinyl chloride liner 25 inserted in the slot 39. The channel 26 can be extruded, and the hydroxyl resin modification made part of the channel slot's surface composition.

Figure 5:
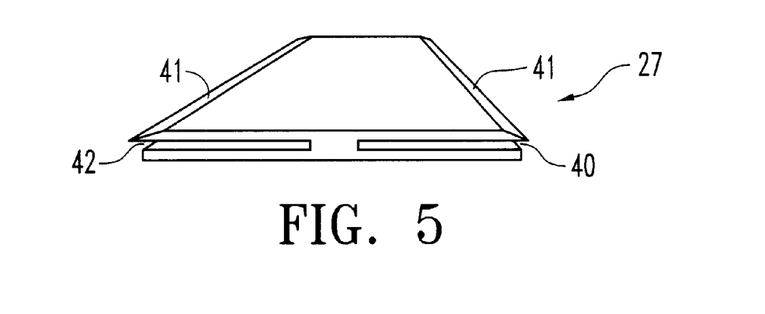
FIG. 5 is a detail of a seam fitting useful in the preferred embodiment of the present invention.

The upper edge of the polyvinyl chloride liner 25 is held in position by an H shaped channel 27. The H shaped channel 27 has two channel slots 40, 42 on opposing ends. The lower channel slot 40 will receive the upper edge of the liner 25, while the upper channel slot 42 will seat the lower edge of the polyvinyl chloride liner 34. The interior surfaces of each of the channel slots 40, 42 preferably have an hydroxyl resin modification as describer above, so that the polyvinyl chloride liners 25, 34 inserted into their corresponding channel slots 40, 42 will form a chemical weld to the channel 27. In this manner, the seal or bond between the polyvinyl chloride liners 25, 34 will be very greatly improved to prevent leaking, cracking or coming apart. The ultimate edges 41 of the channel slots 40, 42, at least as they face the waste water 12 when in use, are beveled to reduce condensate collection in the corner that would otherwise form between the liners 25, 34 and their corresponding channel slots 40, 41.

Figure 6:
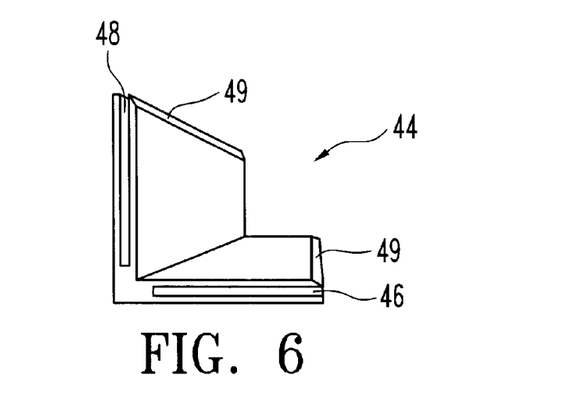
FIG. 6 is a detail of a corner fitting useful in the preferred embodiment of the present invention.
Figure 7:
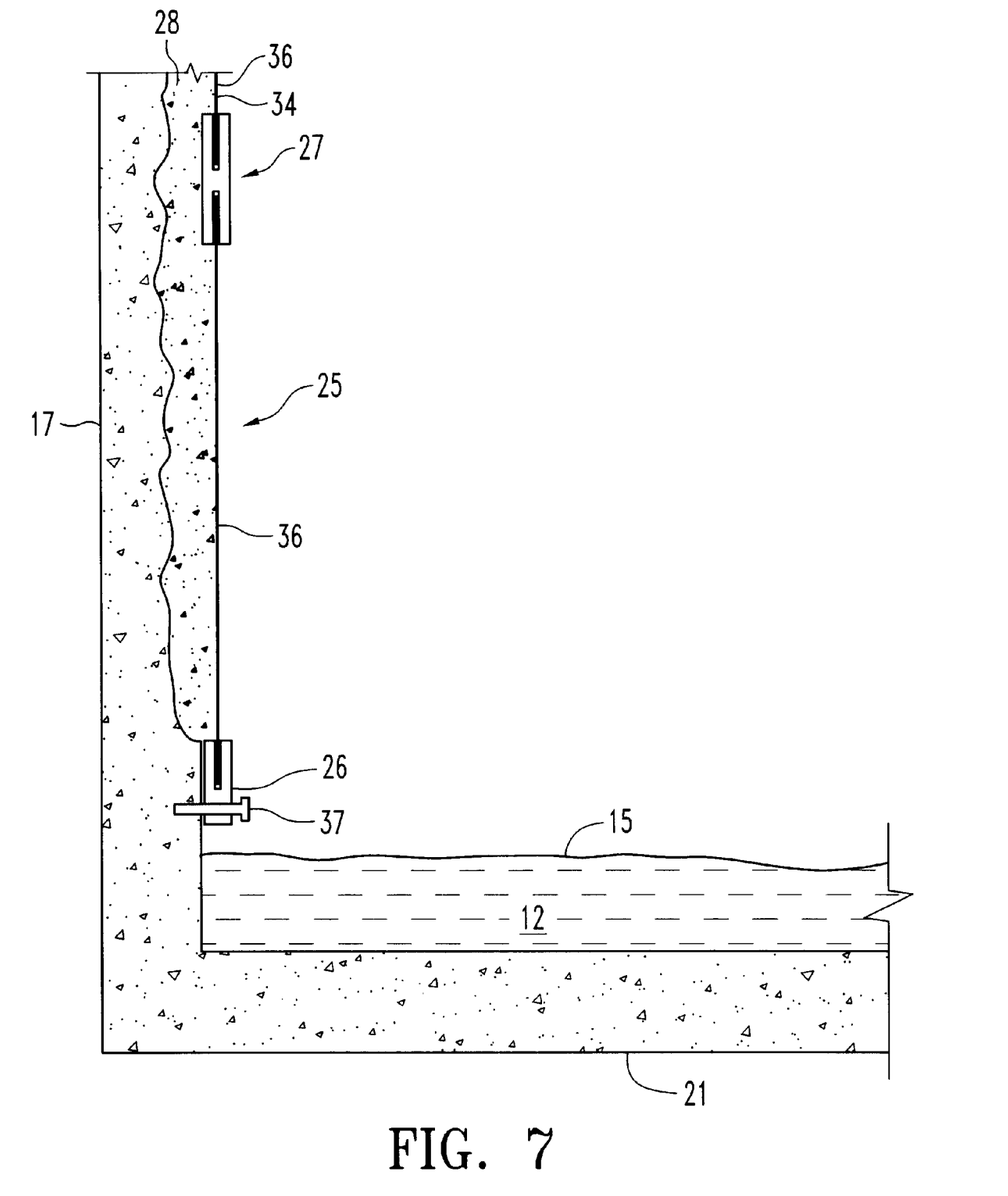
FIG. 7 is cross-sectional, side elevation view of another of the steps of the preferred embodiment of the present invention.

In FIG. 6, a corner channel 44 is shown, for holding the polyvinyl chloride liner 34 at it upper edge into the corner between the side wall 17 and the top wall or ceiling 19. The upper edge of the polyvinyl chloride liner 34 will seat within the channel slot 46, while a comparable polyvinyl chloride liner 55 (better seen in FIG. 8) will insert and seat in the channel slot 48, oriented horizontally. Each of the channel slots 46, 48 has its interior surfaces treated as set forth for the channel slot 39 described above. The polyvinyl chloride liners 34, 55 are activated as also set forth above. In this manner, a chemical weld is accomplished between the polyvinyl chloride liners 34, 55 and the channel 44. The ultimate edges 49 of the channel slots 46, 48, at least as they face the waste water 12 when in use, are beveled.

Referring to the block schematic diagram of FIG. 2, a composition is made 50 for the substratum 28. The substratum 28 is a foam is made from a polyurethane resin and an isocyanate. The polyurethane resin is hydrogenated with water to provide the foaming capability. Since the polyurethane is to be held by the form made by the liners 25, 34, 55, it will not be necessary to adjust the composition of the resin to make it viscous. A suitable surfactant is added to control cell size and structure. It is believed that for optimum restoration, the cell structure should be comprised mostly of closed cells of small size.

Only so much water is used in order to result in a polyurethane foam having a density of at least ten pounds per cubic foot, but preferably in the range of from sixteen to fifty-five pounds per cubic foot. Twenty-three pounds per cubic foot density has been used with good results. It is believed that this density range provides a polyurethane foam which is sufficiently strong to restore the strength necessary for a good sewer pipe or conduit. Further, such density has a flexibility which maintains the integrity of the conduit and the restoration during thermal cycling land most ground movements. It is believed that below ten pounds per cubic foot density will result in a foam that is insufficiently strong. The precise amount of water is determined according to the strength desired in the conduit to be restored, and costs associated with the restoration.

The polyurethane resin components are blended. The surfactant is blended with the resin in the presence of a catalyst, such as dibutyltindilaureate, in a container having blending blades rotated at 1750 rpm for two hours or more. The curing agent is formed by prepolymerizing a quantity of the resin with the isocyanate to balance the volumetric ratio of resin and curing agent to a ratio of approximately 1:1. To prepolymerize, the components are blended with a mixer blade rotating at a speed of 450 rpm for approximately two hours. The blended resin and the curing agent are transmitted through separate conduits to the location of application on the deteriorated walls 17, 18, 19 of the conduit 14 requiring restoration.

As the third step 52 in the method of the present invention (FIG. 2), the polyurethane foam is inserted initially into the void or space 29 defined by the walls 17, 18 and the polyvinyl chloride liners 25, 34, 55 comprising the form. As the polyurethane cures or hardens to form a portion of the substratum 28, additional polyurethane resin and isocyanate are poured on top of the previously poured and now hardened polyurethane. Such pouring can be from inside the conduit 14, as the restoration progresses up to the top wall 19. Ultimately, the polyvinyl chloride liners 55 are positioned for the top wall 19. The polyurethane foam for the ceiling or top wall 19 is then poured through the port 23, which can be made at various points along the length of the conduit 14 being restored.

The polyurethane can be conveyed to the entry for the port 23 and inserted into the space 29 between the top wall 19 and the conduit surface 22, and to the space 29 between walls 17, 18 and the corresponding liners 25, 34, 55 by forcing the hydrogenated resin through one conduit, and the isocyanate through a second conduit in a flexible hose with appropriate heating, as explained in greater detail in U.S. Pat. No. 4,792,493, the methods and means therein set forth being incorporated herein in this application as though fully set forth at length.

As the fourth step 54 in this process (FIG. 2), the resin and curing agent interact to form a closed cell plastic foam. The polyurethane foam cures and forms the bonds with the polyvinyl chloride liners in approximately from five to ten minutes. A weld will be established between the polyurethane foam substratum 28 and the treated surfaces 32 of the polyvinyl chloride liners 25, 34, 55.

Figure 8:
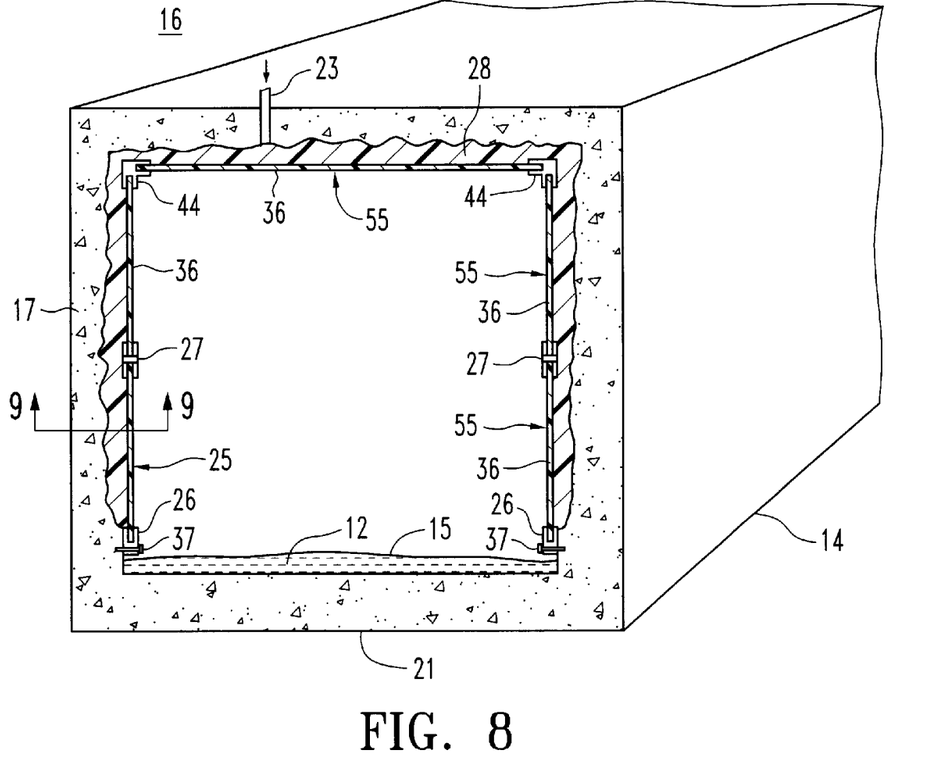
FIG. 8 is a cross-sectional elevation view of the fluid conduit within the ground showing the preferred embodiment of the present invention; and, FIG. 9 is a cross-sectional view of a wall of the conduit within the ground of FIG. 8 taken along line 9—9 showing the result of utilizing the preferred embodiment of the present invention.
Figure 9:
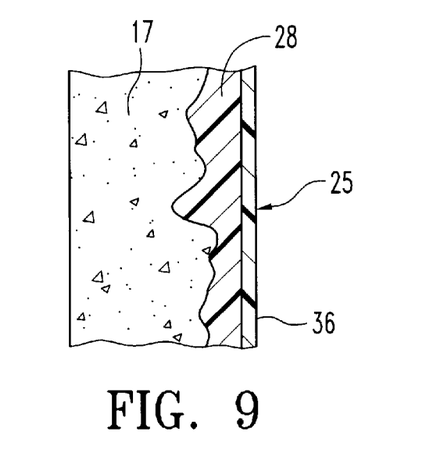

By the foregoing method, a restored conduit 14, as better seen in FIGS. 8 and 9, is provided having a fully sealed interior surface comprising the interior facing surfaces 36 of the liner liners 25, 34, 55, all of which is composed of polyvinyl chloride, which resists corrosion from waste water 12. The structural strength of the conduit 14 is restored by the restoration of the thickness of the walls 17, 18, 19 by a polyurethane foam substratum 28 which has as good and better structural strength as the original concrete 24 which had deteriorated. The bond between the polyurethane foam substratum 28 and the liners 25, 34, 55 is a weld which is accomplished at substantially ambient temperatures in a short period of time, well within the time windows available in waste water conduit and sewer restoration. Further, the seams between the liner sections 25, 34, 55 are chemically sealed by the welding between the liners 25, 34, 55 and the joining channels 26, 27, 44. The lower most liners 25, 55 are secured to the concrete by channels 26, which are held against the 32 walls 17, 19 by corresponding bolts 37.

The effect of using the method of the present invention, in providing a suitable protection for a concrete conduit can be better understood from the following example which is given here to aid in understanding the present invention. This example is to be understood as an example of one use of the present invention, and is not to be taken by way of limitation on the invention which is defined by the claims appended:

EXAMPLE I

A concrete rectangle approximately three feet in length, twenty inches in width and eight inches in height, open at the top or upper and at the bottom, was placed on a plate. The concrete was three inches thick. A form consisting of relatively rigid polyvinyl chloride sheets, one-eighth inch in thickness. The polyvinyl chloride was modified by applying the moisture cured primer-activator according to the present invention as described above. The form was positioned to provide a one-inch space between the form and the interior surfaces of the concrete rectangle. The form consisted of six separate sheets positioned together by channels. Four corner channels formed as described above joined or held the sheets at the corners. An H shaped channel was used to join two adjacent sheets on each of the two longer sides. A polyurethane foam was made according to the procedure described for the preferred embodiment above. The foam had a density of 23 pounds per cubic foot. This foam has been shown to provide, when cured, structural strength as good as and greater than comparably thick concrete. The polyurethane foam was made in an ambient temperature of approximately 75 degrees Fahrenheit. The concrete rectangle and form were placed in an ambient temperature of from 55 degrees to 60 degrees Fahrenheit. The foam was poured into the space between the treated polyvinyl chloride form and the concrete. The foam had set and cured to a hard plastic in about five minutes. Moreover, the foam had welded to the form in the same time period.

An alternative embodiment comprises the use of a foamed epoxy as the substratum 28. A suitable surfactant is added to control cell size and structure. It is believed that for optimum restoration, the cell structure should be comprised mostly of closed cells of small size. The density of the foamed epoxy should be from ten to fifty-five pounds per cubic foot. The choice of density is made according to the strength desired in the conduit to be restored, and costs associated with the restoration.

Those skilled in the art may perceive other suitable procedures for forming the foam with the polyurethane or epoxy. In addition, those skilled in the art may perceive procedures for forming a foam with other reactive resins, such as polyesters and polyureas. For example, blending hollow ceramic microspheres with a reactive or a curing resin system will form a foam.

The foregoing description of my invention and of preferred embodiments as to products, compositions and processes is illustrative of specific embodiments only. It is to be understood, however, that additional embodiments may be perceived by those skilled in the art. The embodiments described herein, together with those additional embodiments, are considered to be within the scope of the present invention, which is to be defined only by the appended claims.

I claim:

1. A method for restoring a concrete structure having an interior surface susceptible to deterioration by contact with corroding agents wherein portions of said structure including portions of said interior surface have been removed as a result of said deterioration to create void spaces where said structure existed, comprising the steps of:
   a) positioning polyvinyl chloride thermoplastic liners sealed to each other where said interior surface has been removed to define void space between said thermoplastic liners and said concrete structure;
   b) hydrogenating a resin selected from the group consisting of polyurethane resin, epoxy resin and combinations thereof;
   c) applying said hydrogenated resin along with a curing agent comprising at least an isocyanate in said void space;
   d) allowing said resin and the curing agent to form a foam to a density of at least ten pounds per cubic foot, and to set to form a foam supporting said thermoplastic liners;
   e) painting a surface of each of said thermoplastic liners, which faces said concrete, with a composition comprising a polymer wherein the polymer is a copolymer of 2-propenoic acid, 2-hydroxypropyl ester, chloroethene and ethenyl acetate the polymer having a density of approximately 1.37 grams per cubic centimeter at 25 degrees Centigrade and a molecular weight of approximately 8,000 to 10,000.

2. The method of claim 1 further comprising the step of securing said polyvinyl chloride thermoplastic liners together with channels to define seams between said thermoplastic liner, and wherein said channels have surfaces abutting said thermoplastic liners, wherein said surfaces abutting said thermoplastic liners have applied thereto said composition.

3. The method of claim 1 wherein said resin comprises an epoxy resin and said curing agent comprises an amine.

4. The method of claim 1 wherein said density of said foam is in the range of from ten pounds to fifty-five pounds per cubic foot.

* * * * *

UNITED STATES PATENT AND TRADEMARK OFFICE
CERTIFICATE OF CORRECTION

PATENT NO.   : 6,494,978 B1
DATED        : December 17, 2002
INVENTOR(S)  : Richard L. Bertram It is certified that error appears in the above-identified patent and that said Letters Patent is hereby corrected as shown below:

Column 1,
Line 57, after "traffic", delete "1".

Column 7,
Line 15, delete "land", and insert -- and --.

Column 8,
Line 17, after "the", delete "32".

Signed and Sealed this

Eighth Day of April, 2003

JAMES E. ROGAN
*Director of the United States Patent and Trademark Office*